United States Patent [19]
Terada

[11] 4,168,051
[45] Sep. 18, 1979

[54] SEAT POSITION-ADJUSTING ASSEMBLY FOR AUTOMOBILE SEATS

[75] Inventor: Takami Terada, Toyoto, Japan

[73] Assignee: Aisin Seiki Kabushiki Kaisha, Kariya, Japan

[21] Appl. No.: 878,266

[22] Filed: Feb. 16, 1978

[30] Foreign Application Priority Data

Mar. 30, 1977 [JP] Japan .................................. 52-36842

[51] Int. Cl.² ........................................... F16M 13/00
[52] U.S. Cl. ....................................... 248/429; 74/533
[58] Field of Search ........................ 248/429, 430, 420; 74/533–536; 308/6 R

[56] References Cited

U.S. PATENT DOCUMENTS

| | | | |
|---|---|---|---|
| 2,225,074 | 12/1940 | Miller | 248/429 X |
| 2,277,947 | 3/1942 | Bailey | 248/429 |
| 3,013,763 | 12/1961 | Weberman | 248/429 |
| 3,790,234 | 2/1974 | Fuelling et al. | 308/6 R |

FOREIGN PATENT DOCUMENTS

| | | | |
|---|---|---|---|
| 648183 | 1/1951 | United Kingdom | 248/429 |
| 1365966 | 9/1974 | United Kingdom | |

*Primary Examiner*—Lawrence J. Staab
*Attorney, Agent, or Firm*—Finnegan, Henderson, Farabow & Garrett

[57] ABSTRACT

An automobile seat position-adjusting assembly having slidably related outer and inner rails rigidly attachable respectively to a seat and automobile floor and a pawl member for selectively locking and unlocking the rails. The inner rail has a plurality of latch recesses, and the pawl member is pivoted on an edge of the outer rail and includes a tooth extending through the outer rail to selectively engage with one of the plurality of latch recesses so as to lock and unlock the slidable rails as the pawl member's handle is manually rotated. The pawl member has a curved lip hinge portion which encloses a protruding edge of the outer rail and is held in place by a spring and the interaction of the pawl and the rails.

12 Claims, 5 Drawing Figures

U.S. Patent  Sep. 18, 1979  Sheet 1 of 2  4,168,051
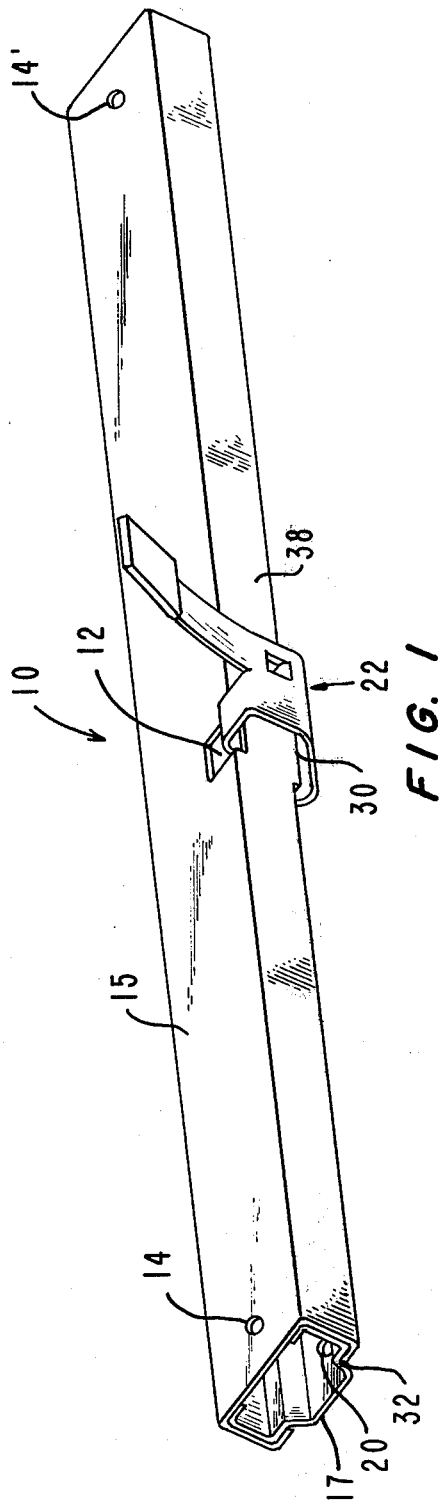
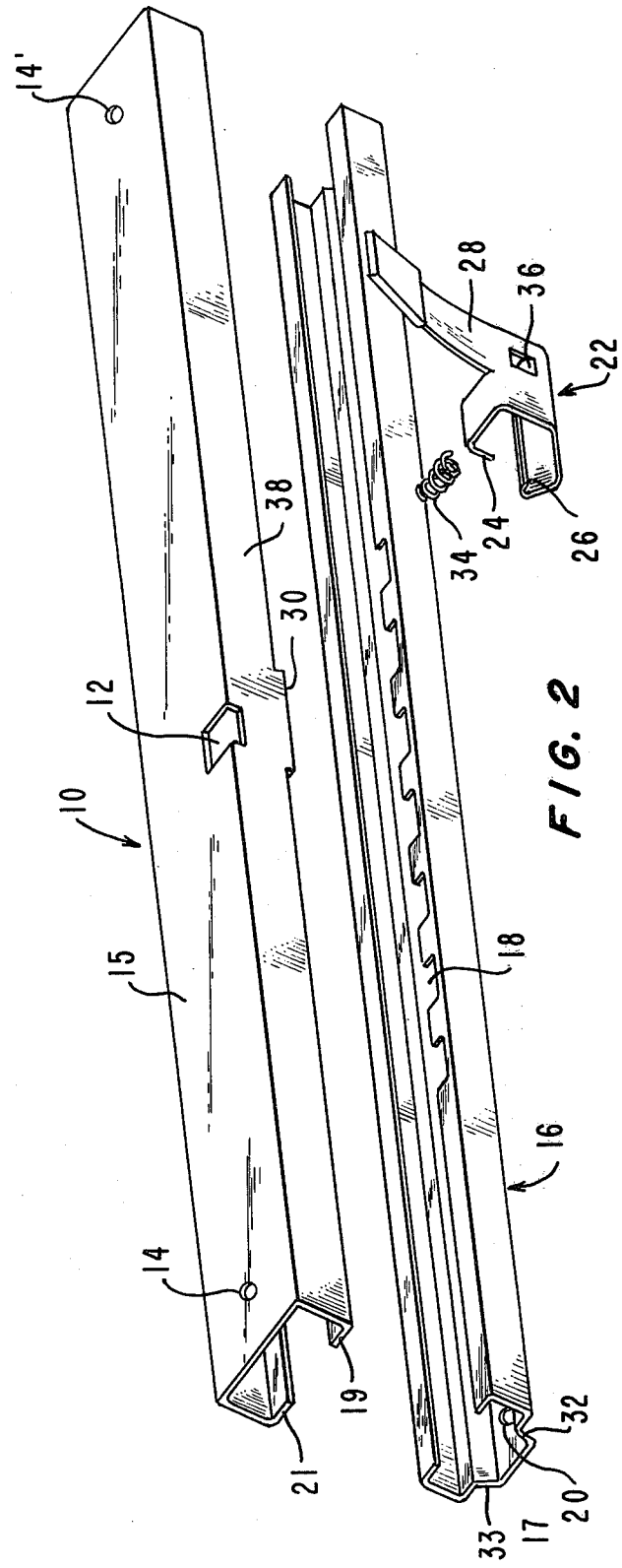

SEAT POSITION-ADJUSTING ASSEMBLY FOR AUTOMOBILE SEATS

BACKGROUND OF THE INVENTION

1. Field of the Invention

The present invention relates generally to position-adjusting assemblies and more particularly to a position-adjusting assembly for automobile seats wherein the seat can be forwardly and rearwardly moved as desired and then locked in place.

2. Description of the Prior Art

Many types and designs of seat-adjusting assemblies for automobile seats have been developed throughout the years. In general, one rail, secured to a seat, is movable relative to a second rail, secured to a vehicle floor, to thereby provide forward and rearward adjustment of the seat position. After such adjustment, an engaging mechanism fixedly secures the two rails to one another in order to prevent undesired relative movement of the rails.

In one well-known engaging mechanism a bracket is mounted on one rail, and a pawl member is rotatably supported on the bracket by a pin or a shaft. Rotation of the pawl member causes the engagement or disengagement of the pawl member with latch holes formed on the other rail, thereby providing a means of locking and unlocking the two rails. Accordingly, the well-known construction of seat-position adjusting assemblies embodies several construction members, requires complicated assembly and becomes unnecessarily expensive.

SUMMARY OF THE INVENTION

It is therefore an object of the present invention to provide a seat position-adjusting assembly which requires fewer parts than the conventional assemblies.

Another object is to provide a seat position-adjusting assembly which is easy to construct and assemble.

A further object is to provide a seat position-adjusting assembly which is less expensive in costs of parts and assembly than the conventional assemblies.

Additional objects and advantages of the invention will be set forth in part in the description which follows, and in part will be obvious from the description, or may be learned by practice of the invention. The objects and advantages are realized and obtained by means of the instrumentalities and the combinations particularly pointed out in the appended claims.

To achieve these objectives, the present invention provides an improved seat position-adjusting assembly for automobile seats which is comprised of only four structural elements, including two rails, a pawl member and a spring. By the construction of the rails, one rail (the inner rail) is slidably inserted within the other rail (the outer rail), and the outer rail holds the inner rail in place allowing only relative sliding. An automobile seat is to be attached to the outer rail, and the inner rail is to be attached to the floor of an automobile. Pivoted directly on a protruding edge of the outer rail is a spring-biased pawl member having a tooth portion which selectively engages latch recesses in the inner rail through the outer rail and an operating handle for manual rotation of the pawl member. A curved lip hinge portion of the pawl member encloses the protruding edge of the outer rail and is held in the resultant pivotal engagement by the spring and a shoulder of the inner rail. The spring normally biases the pawl member in a closed position so as to lock the rails with respect to one another, but manual rotation of the pawl member disengages the tooth portion and allows the relative sliding of the rail members. When the seat is slid to its desired position, the pawl member, extending through a recessed groove in the outer rail, is released and the spring biases the pawl's tooth portion into engagement with the inner rail recesses and again locks the rails against relative sliding motion.

It is to be understood that both the foregoing general description and the following detailed description are exemplary and explanatory only and are not restrictive of the invention, as claimed.

The accompanying drawings, which are incorporated in and constitute a part of this specification, illustrate an example of a preferred embodiment of the invention and together with the description serve to explain the principles of the invention.

BRIEF DESCRIPTION OF THE DRAWINGS

FIG. 1 is a perspective view of one embodiment according to the invention.

FIG. 2 is an exploded view of the embodiment of FIG. 1.

DETAILED DESCRIPTION OF THE INVENTION

Figure 3:
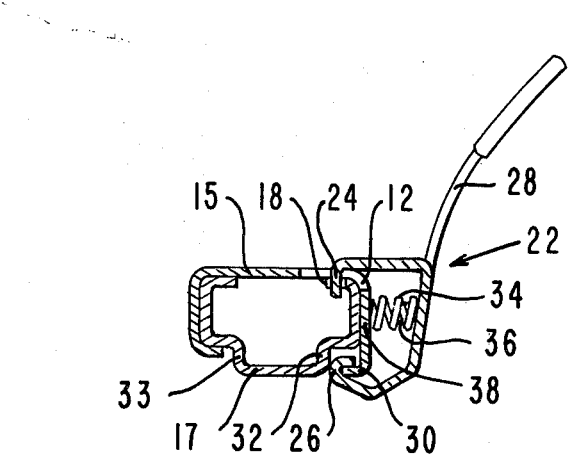
FIG. 3 is a sectional view taken along line 3—3 of FIG. 1 showing the rails in locked relationship.

With reference now to the drawings, wherein like reference characters designate like or corresponding parts throughout the several views, there is shown a seat position-adjusting assembly exemplifying the invention. An outer rail 10 is provided with a recessed groove 12 at the central portion thereof and screw holes 14, 14' at both ends of its faceplate 15. A seat (not shown) is to be fixedly attached to the upper rail 10 by screws (not shown) protruding through both screw holes 14, 14'.

In accordance with the invention, an inner rail 16 is provided with screw holes 20 (only one being shown) positioned at both ends of its faceplate 17 and is further provided with a plurality of latch means. As embodied herein the latch means are alternatively either a plurality of latch recesses 18 cut into a top flange of the inner rail 16 and spaced at intervals along its length, as shown in FIG. 1, or a plurality of latch holes 40 drilled or stamped in a bottom portion of the inner rail 16 and spaced at intervals along its length, one such latch hole being shown in FIG. 5. The inner rail 16 is to be fixedly attached to a vehicle floor (not shown) by screws (not shown) which protrude through both screw holes 20.

The outer rail 10 and the inner rail 16 have substantially C-shaped cross sections, the inner cross sectional dimensions of outer rail 10 being slightly larger than the outer cross sectional dimensions of inner rail 16. As shown in FIG. 1 when inner rail 16 is inserted into outer rail 10, both rails are interlocked as to lateral movement, and the inner rail 16 is slidably held by the outer rail 10. When the outer rail 10 and inner rail 16 are assembled, face 15 of outer rail 10 and face 17 of inner rail 16 face outwardly in opposite directions and the recessed groove 12 is selectively alignable with the latch recesses 18 during the relative slidable adjustment of the rails.

Formed on the outer rail 10 opposite and parallel to the faceplate 15 of that rail are inwardly turned flanges 19 and 21 upon which the inner rail 16 slides. Inward of the sliding interface of rail 16 and flanges 19 and 21, shoulders 32 and 33 are formed on the inner rail 16 to project faceplate 17 of rail 16 below flanges 19 and 21.

In accordance with the invention a pawl means selectively locks and unlocks the inner and outer rails with respect to each other. As embodied herein the pawl means, identified generally as pawl member 22, includes a C-shaped element and an operating handle portion 28. The C-shaped element includes a tooth portion 24 at the upper end, a curved lip hinge portion 26 at the lower end, and a stud portion 36 at its midsection. In the preferred embodiment the tooth portion 24, curved lip hinge portion 26, operating handle portion 28 and stud portion 36 of the pawl member 22 are one continuous and integral element formed from a single piece of sheet metal.

As shown in FIG. 3, the pawl member 22 is positioned on the interlocked rails 10 and 16 so that tooth portion 24 protrudes through recessed groove 12 of outer rail 10 and upon rotation selectively engages and disengages latch recesses 18 of inner rail 16 to lock and unlock the rails with respect to one another. Curved lip hinge portion 26 of pawl member 22 encloses inwardly protruding edge 30 of the outer rail 10 for pivoting thereon. The inwardly protruding edge 30 is formed from a cut-out portion of the flange 19 and aligns generally with recessed groove 12 of outer rail 10.

In accordance with the invention, means are provided for urging the tooth portion 24 into engagement with the latch recesses 18. As embodied herein the urging means is a spring 34 inserted over the stud portion 36 of pawl member 22 and fixedly positioned between a side wall portion 38 of the outer rail 10 and the pawl member. Spring 34 urges the pawl member 22 to rotate about the pivot point at curved lip hinge portion 26 in a clockwise direction and thus urges tooth portion 24, extending through the recessed groove 12, into engagement with a latch recess 18 of inner rail 16. Thus, FIG. 3 shows the inner rail 16 and outer rail 10 in locked engagement, thereby preventing any relative sliding of these rails.

In accordance with the invention, means are provided for preventing the disengagement of the curved lip hinge portion 26 from the protruding edge 30. As embodied herein the disengagement prevention means is either the resilient spring 34 which urges the curved lip hinge portion 26 into engagement with the protruding edge 30 or the shoulder 32 of inner rail 16 which is spaced opposite from the protruding edge 30 to house the curved lip hinge portion 26 between the shoulder 32 and the protruding edge 30.

Figure 4:
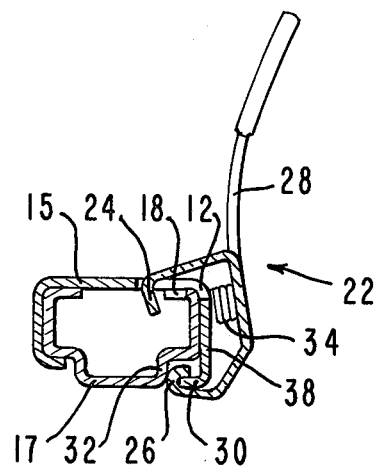
FIG. 4 is a sectional view similar to the section view in FIG. 3 which shows the rails in unlocked relationship.

A counterclockwise rotation of pawl member 22 unlocks inner rail 16 and outer rail 10 and thus allows the free relative sliding of the rail members. A sufficient leftward force imparted upon the operating handle portion 28, in the arrangement as shown in the drawings, will overcome the opposing force of spring 34 and rotate the pawl member 22 in a counterclockwise manner. As shown in FIG. 4, the counterclockwise rotation of pawl member 22 about the protruding edge 30 of the outer rail 10 moves tooth portion 24 of pawl member 22 out of engagement with the latch recess 18 and allows the free sliding of rails 10 and 16.

Figure 5:
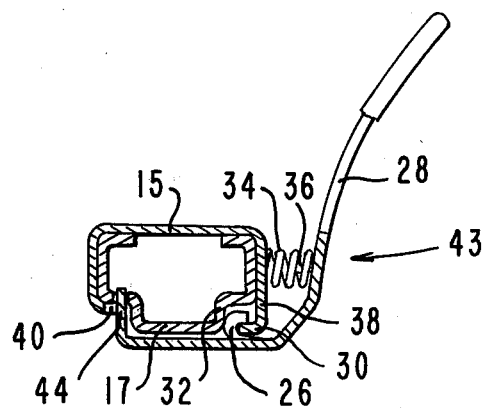
FIG. 5 is a sectional view showing a second embodiment of the invention in locked relationship.

FIG. 5 shows a second embodiment of the invention wherein the same reference numerals as in the first embodiment are used where the respective elements have the same function and operation as previously described. In the second embodiment, outer rail 10 has a recessed groove 40 formed on flange 21 of outer rail 10 at its longitudinal center. Inner rail 16 has a plurality of latch holes 42 drilled or stamped in the bottom portion of the inner rail 16 and spaced at intervals along its length. These latch holes are slidably alignable with recessed groove 40.

In accordance with the invention the pawl means of the second embodiment selectively locks and unlocks the abovemodified inner and outer rails with respect to each other. As embodied herein the second embodied pawl means, generally identified as pawl member 43, includes a generally L-shaped element having an operating handle portion 28 at one end, a tooth portion 44 at the other end, a curved lip hinge portion 26 formed at approximately the bend of the L-shaped element, and a stud portion 36 formed on the L-shaped element between the hinge portion 26 and the handle portion 28. In the preferred embodiment the handle portion 28, tooth portion 44, curved lip hinge portion 26 and stud portion 36 are one continuous and integral element formed from a single piece of sheet metal.

As shown in FIG. 5 pawl member 43 is positioned on interlocked rails 10 and 16 so that tooth portion 44 protrudes through recessed groove 40 of outer rail 10 and upon rotation selectively engages and disengages latch holes 42 of inner rail 16 to lock and unlock the rails with respect to one another. The curved lip hinge portion 26 of pawl member 43 encloses the inwardly protruding edge 30 of the outer rail 10 in the same manner disclosed in reference to FIGS. 1–4. Similarly, as disclosed earlier, the spring 34 urges the tooth portion 44 through recessed groove 40 and into engagement with the latch holes 42. Spring 34 also urges curved lip hinge portion 26 into engagement with inwardly protruding edge 30. FIG. 5 shows the inner and outer rails in locked engagement, it being understood that the counterclockwise rotation of handle portion 28 would unlock the rails for slidable adjustment.

The operation according to the invention will now be described both as to the assembly of the disclosed seat position-adjusting assembly and the operation of the seat position-adjusting assembly. The operation and assembly will be discussed with reference to the first embodiment shown in FIGS. 1 through 4, but it is to be understood that the operation and assembly is the same for the second embodiment.

Before the seat position-adjusting assembly is assembled, it consists of four elements: the outer rail 10, the inner rail 16, the pawl member 22, and spring 34. Pawl member 22 is associated with upper rail 10 so that curved lip hinge portion 26 encloses inwardly protruding edge 30, and tooth portion 24 protrudes through recessed groove 12. The spring 34 is seated upon the stud portion 36 of pawl member 22 and between side portion 38 and pawl member 22. Thereafter, the inner rail 16 is slidably inserted into outer rail 10, and, when rail 16 reaches pawl member 22, the pawl member 22 is rotated in a counterclockwise direction, as shown in FIG. 4, to allow continued sliding of the rail members. Once the lower rail 16 is slid past the inwardly protruding edge 30 of outer rail 10, the shoulder 32 of the inner rail 16 prevents curved lip hinge portion 26 of pawl member 22 from disengaging from inwardly protruding edge 30. Additionally, spring 34 urges curved lip hinge portion 26 into engagement with protruding edge 30. When the two rail members are positioned as desired, pawl member 22 is released and spring 34 urges tooth portion 24 into engagement with a latch recess 18 and thus locks the seat position-adjustment assembly.

Referring to the operation of the seat position-adjusting assembly, the rotation of operating handle portion 28 in a counterclockwise direction pivots the pawl member about the protruding edge 30 and releases the tooth portion 24 of the pawl member from a latch recess 18 of the inner rail 16. Spring 34 is compressed. As shown in FIG. 4, this release of the pawl member allows the forward and rearward sliding of the outer rail 10 with respect to the inner rail 16 to occur, thereby providing adjustment of the seat to a desired position. After the seat is adjusted to the desired position, the operating handle portion 28 is released and the tooth portion 24 is urged into engagement with a latch recess 18 by spring 34. The rails are thereby locked in the desired position.

It is obvious to design the seat position-adjusting device so that the outer rail is rigidly attached to an automobile floor and the inner rail is rigidly attached to an automobile seat.

Obviously, many modifications and variations of the present invention are possible in light of the above teachings. The invention in its broader aspects is not limited to the specific details shown and described, and departures may be made from such details without departing from the principles of the invention and without sacrificing its chief advantages.

What is claimed is:

1. A seat position-adjusting assembly comprising an inner rail and an outer rail, the rails being slidably adjustable one with respect to the other; pawl means having a tooth portion for selectively locking and unlocking the rails with respect to each other, a curved lip hinge portion enclosing a protruding edge of said outer rail for pivoting thereon and a handle portion; and means for preventing disengagement of said curved lip hinge portion from said protruding edge including a shoulder on said inner rail spaced opposite from said protruding edge to house said curved lip hinge portion between said shoulder and said protruding edge.

2. A seat position-adjusting assembly as in claim 1 wherein one of said rails is to be fixed to an automobile floor and the other of said rails is to be fixed to an automobile seat.

3. The seat position-adjusting assembly as in claim 1 wherein said tooth portion, hinge portion and handle portion are one continuous and integral element.

4. A seat position-adjusting assembly as in claim 1 wherein said inner and outer rails are substantially C-shaped in cross section.

5. A seat position-adjusting assembly as in claim 1 wherein said inner rail is held against laternal movement by said outer rail.

6. The seat position-adjusting assembly in claim 1 wherein said means for preventing disengagement is a spring which urges said lip hinge portion into engagement with said protruding edge.

7. The seat position-adjusting assembly as in claim 1 further comprising latch means on the inner rail, a recessed groove selectively alignable with said latch means on said outer rail and wherein said tooth portion of said pawl means protrudes through said recessed groove and selectively engages said latch means.

8. The seat position-adjusting assembly as in claim 7 further comprising urging means for urging said tooth portion into engagement with said latch means.

9. A seat position-adjusting assembly in claim 8 wherein said urging means is a spring fixedly positioned between said pawl means and said outer rail.

10. The seat position-adjusting assembly as in claim 7 wherein said latch means is a plurality of recesses.

11. The seat position-adjusting assembly in claim 7 wherein said latch means is a plurality of latch holes in a bottom portion of said inner rail and said pawl means is a generally L-shaped element having said handle portion at one end, said tooth portion at the other end and said curved lip hinge portion at approximately the bend of the L-shaped element.

12. A seat position-adjusting assembly comprising an inner rail and an outer rail, said inner rail having a top flange, said rails being slidably adjustable one with respect to the other, a plurality of latch recesses in said top flange of said inner rail, a recessed groove provided at a central portion of said outer rail and being selectively alignable with said latch recesses, an inwardly protruding edge on said outer rail generally aligned with said recessed groove, a pawl member including a handle portion and a C-shaped element, said C-shaped element having a curved lip hinge portion enclosing said inwardly protruding edge for pivoting thereon and a tooth portion protruding through said recessed groove and, upon rotation of said pawl member, selectively engaging said latch recesses, a spring fixedly positioned between said pawl member and said outer rail for urging said tooth portion into engagement with said latch recesses and for urging said lip hinge portion toward said inwardly protruding edge, and a shoulder on said inner rail spaced opposite from said inwardly protruding edge to house said curved lip hinge portion between said shoulder and said inwardly protruding edge.

* * * * *